US 009787129 B2

(12) United States Patent
Green et al.

(10) Patent No.: US 9,787,129 B2
(45) Date of Patent: Oct. 10, 2017

(54) SYSTEM FOR DISPLAYING PRODUCTS (71) Applicant: Apple Inc., Cupertino, CA (US)

(72) Inventors: Christopher M. Green, Woodside, CA (US); David Benjamin Kosecoff, San Francisco, CA (US); David Samuel Kumka, San Francisco, CA (US); Kully Kraig Mandon, San Francisco, CA (US); Daniel McBroom, Leander, TX (US); Michael D. McBroom, Leander, TX (US); Jonathan P. Siegel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 14/837,603

(22) Filed: Aug. 27, 2015

(65) Prior Publication Data

US 2016/0064996 A1    Mar. 3, 2016

Related U.S. Application Data

(60) Provisional application No. 62/045,474, filed on Sep. 3, 2014.

(51) Int. Cl.
*H02J 7/02* (2016.01)
*H02J 7/00* (2006.01)
*A47B 13/00* (2006.01)
*A47F 7/02* (2006.01)
*A47B 88/90* (2017.01)
*A47B 88/969* (2017.01)

(52) U.S. Cl.
CPC .............. *H02J 7/025* (2013.01); *A47B 13/00* (2013.01); *A47B 88/90* (2017.01); *A47F 7/022* (2013.01); *H02J 7/0044* (2013.01); *H02J 7/0045* (2013.01); *H02J 7/0052* (2013.01); *A47B 2088/976* (2017.01); *H02J 2007/0062* (2013.01)

(58) Field of Classification Search
CPC ........ H02J 7/025; H02J 7/0052; H02J 7/0045; H02J 2007/0062
USPC ....................................................... 320/108
See application file for complete search history.

(56) References Cited

U.S. PATENT DOCUMENTS

| | | |
|---|---|---|
| 5,816,696 A | 10/1998 | Beisler |
| 2003/0146755 A1 | 8/2003 | Kitazawa et al. |
| 2006/0262525 A1 | 11/2006 | Barbeau et al. |
| 2011/0025263 A1 | 2/2011 | Gilbert |

(Continued)

FOREIGN PATENT DOCUMENTS

| | | |
|---|---|---|
| CN | 203619028 U | 6/2014 |
| DE | 29821588 U1 | 4/1999 |

(Continued)

OTHER PUBLICATIONS

International Search Report and Written Opinion, published Mar. 10, 2016, for International Patent Application No. PCT/US2015/047539, filed Aug. 28, 2015.

(Continued)

*Primary Examiner* — Sun Lin
(74) *Attorney, Agent, or Firm* — Sterne, Kessler, Goldstein & Fox P.L.L.C.

(57) ABSTRACT

A display system for displaying an electronic device is disclosed. The display system includes a cup disposed in an aperture of a tray with a charging fixture disposed therein. The charging fixture includes a charging element for magnetically attaching to an electronic device and providing power to the electronic device.

26 Claims, 8 Drawing Sheets

(56) References Cited

U.S. PATENT DOCUMENTS

2013/0206042 A1   8/2013   Mohammed
2014/0227893 A1   8/2014   Howard

FOREIGN PATENT DOCUMENTS

DE   202014100038 U1   4/2014
EP       2033539 A1   3/2009
JP      2000236949 A   9/2000

OTHER PUBLICATIONS

International Search Report and Written Opinion, published Mar. 10, 2016, for International Patent Application No. PCT/US2015/047543, filed Aug. 28, 2015.
International Search Report and Written Opinion, published Mar. 10, 2016, for International Patent Application No. PCT/US2015/047545, filed Aug. 28, 2015.

SYSTEM FOR DISPLAYING PRODUCTS

CROSS-REFERENCE TO RELATED APPLICATION(S)

This application claims priority to U.S. Provisional Application No. 62/045,474, filed on Sep. 3, 2014, which is incorporated herein in its entirety by reference thereto

FIELD

The described embodiments relate generally to a system for displaying an electronic device. More particularly, the present embodiments relate to a system having a charging fixture for providing power to an electronic device while the electronic device is displayed in the system.

BACKGROUND

A retailer or other person may desire to provide a system for displaying an electronic device.

SUMMARY

A retailer or other user may have various locations within a store or other location for using, displaying, testing, and/or providing technical assistance for electronic devices. The retailer may wish to have a display system at these locations, or a mobile display system, to provide a convenient way for the electronic devices to be displayed. The retailer may wish to have power available to the devices for powering the electronic devices while they are displayed or stored. In some cases, the retailer may wish to have a display system to provide a convenient place for the electronic devices to be stored when they are not displayed. In some cases, a retailer may wish to supply power to electronic devices while in storage. To accomplish these and other objectives, the retailer may use systems mechanisms, and methods according to embodiments described herein.

In some embodiments of the present invention, a tray is provided with mechanisms for transferring power conveniently located within cups disposed within the tray. In some embodiments, only a charging element of the mechanism may be visible within the cup. Wires and ports (e.g., for power and other electrical equipment) may be hidden from view. Power is thereby readily accessible to an electronic device within the tray.

In some embodiments, a display system may include at least one cup with a bottom surface and a perimeter surface, the perimeter surface extending from the bottom surface. The bottom surface and perimeter surface of the cup define an inner cavity. A powered charging fixture including a charging element may be disposed within the cup cavity and may be used to provide power to an electronic device.

In some embodiments, a charging system for providing power to an electronic device may include a display surface with an aperture therethrough. The charging system may also include a mounting surface below the display surface and spaced apart from the display surface. The charging system may also include a charging fixture. The charging fixture may include a bearing on the mounting surface, a support bracket including an aperture positioned over the bearing, a post extending from the bearing through the aperture of the support bracket and through the aperture of the display surface, and a charging element coupled to the post and positioned above the display surface.

In some embodiments, a display system includes a cup defining a cavity and an outer surface, and a tray with at least one aperture, where the cup is disposed within the aperture of the tray. The display system may include an outer housing defining a cavity, where the tray and the cup are disposed within the cavity of the housing. The display system may also include a charging fixture mounted to the housing and at least partially disposed within the cup.

In some embodiments a display system includes a plurality of cups, each cup including an inner cavity. The display system may include a plurality of charging fixtures, where each of the charging fixtures is disposed in one of the inner cavities of the cups. The display system may also include a printed circuit board (PCB) disposed in the housing and a power supply coupled to the PCB. The PCB may include a plurality of outputs that are connected to a plurality of charging fixtures, supplying power to the electronic devices.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, they are intended to cover alternatives, modifications, and equivalents as can be included within the spirit and scope of the described embodiments as defined by the appended claims.

References to "one embodiment," "an embodiment," "some embodiments," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A retailer or other user may have various locations within a store or other location for using, displaying, testing, and/or providing technical assistance for electronic devices. The retailer may wish to have a display system at these locations, or a mobile display system, to provide a convenient way for the electronic devices to be displayed. In some cases, the retailer may wish to have power available to the devices for powering the electronic devices while they are displayed or stored. In some cases, the retailer may wish to have a display system to provide a convenient place for the electronic devices to be stored when they are not displayed. The retailer may wish to supply power to electronic devices while in storage.

Power is typically provided to an electronic device through a power wire, which is typically physically connected by a wire between a power supply port and a power port of the electronic device for providing power to that electronic device. These ports and wires are typically visible and may interrupt use of the electronic device (e.g., by tethering it to a supply port). In some cases, power wires may be disconnected from device and/or supply ports, and must be located and plugged in to the device to supply power. This means that unused cords are often kept nearby in order to be on hand when needed, but are also often misplaced or repurposed, and so may be unavailable to a user when needed. Thus, stray cords, which may be disconnected or tangled, may reduce charging efficiency. Further, an electronic device on display connected to a visible power wire, and visible ports and wires to which a device is not connected, may interrupt the aesthetic appearance of the electronic device or the display area, and complicate its use for providing power to the electronic device.

In some embodiments of the present invention, a display system may provide power access within a display area for maintaining power levels of displayed devices in the display area. In some embodiments described herein, a display area of a described display system may also be a storage area for devices disposed therein. Thus, when discussing a display area or display device, it should be understood that the principles discussed also apply to a storage area or storage device, and to areas and devices that double as both storage and display areas or storage and display devices.

To transfer power to an electronic device without direct connection to a power wire, display systems of the present invention may include an inductive charging fixture in a display area thereof. In this way, when an electronic device is placed in the display area, it can automatically receive power wirelessly from an inductive charging element of the charging fixture, without connection via wires. Any wires or ports used to transfer power from a power source to the inductive charging elements may not be visible in the display area, but instead may be hidden from view by, in some embodiments, being concealed under or within a tray that may be disposed in a housing for display or storage. For example, power ports or wires may be concealed under or within a tray. In this way, power wires and ports, and other electronic elements, may be concealed in an inconspicuous manner that does not interfere with the display area, which may be above the tray.

To accomplish these and other objectives, a retailer may use a display system as described herein, where power wires and ports are incorporated into a tray that conceals them from view, and provides power to electronic devices without the need for physical connection to the devices.

In some embodiments, power is available to electronic devices through a charging fixture that may be provided in the display system. The charging fixture may include a charging element, a magnet disposed within the charging element for connecting to the electronic device, and an induction coil for providing power. When a magnetic attraction is made between the electronic device and the charging element, the charging element may magnetically couple to the electronic device and the electronic device will be provided with power through inductive charging. In this way the electronic device can be powered without connecting wires to it, and can be provided with power by the simple act of placing it near the charging element.

These and other embodiments are discussed in more detail below with reference to FIGS. 1-10. However, those skilled in the art will readily appreciate that the detailed description given herein with respect to these figures is for explanatory purposes only and should not be construed as limiting.

Some embodiments of the present invention may include a display system 100 for displaying (or storing) and powering electronic devices 400. In some embodiments, display system 100, may include a tray 102 (see, e.g., FIGS. 1-3). Tray 102 may include a display surface 208 with at least one aperture 230 therethrough. In some embodiments, display system 100 may include a cup 200, where cup 200 is disposed within an aperture 120 of tray 102. In such embodiments, display surface 208 may be a surface of cup 200 (e.g., a bottom surface 202 of cup 200, as shown, for example, in FIG. 6). In some embodiments, display system 100 may include a powered charging fixture 300, which may include a charging element 310 (e.g., charging puck 310 disposed above display surface 208 of tray 102). In some embodiments, charging fixture 300 may be at least partially disposed within cup 200 (e.g., disposed above display surface 208 of cup 200) and may provide power to an electronic device 400 through charging element 310.

Figure 1:
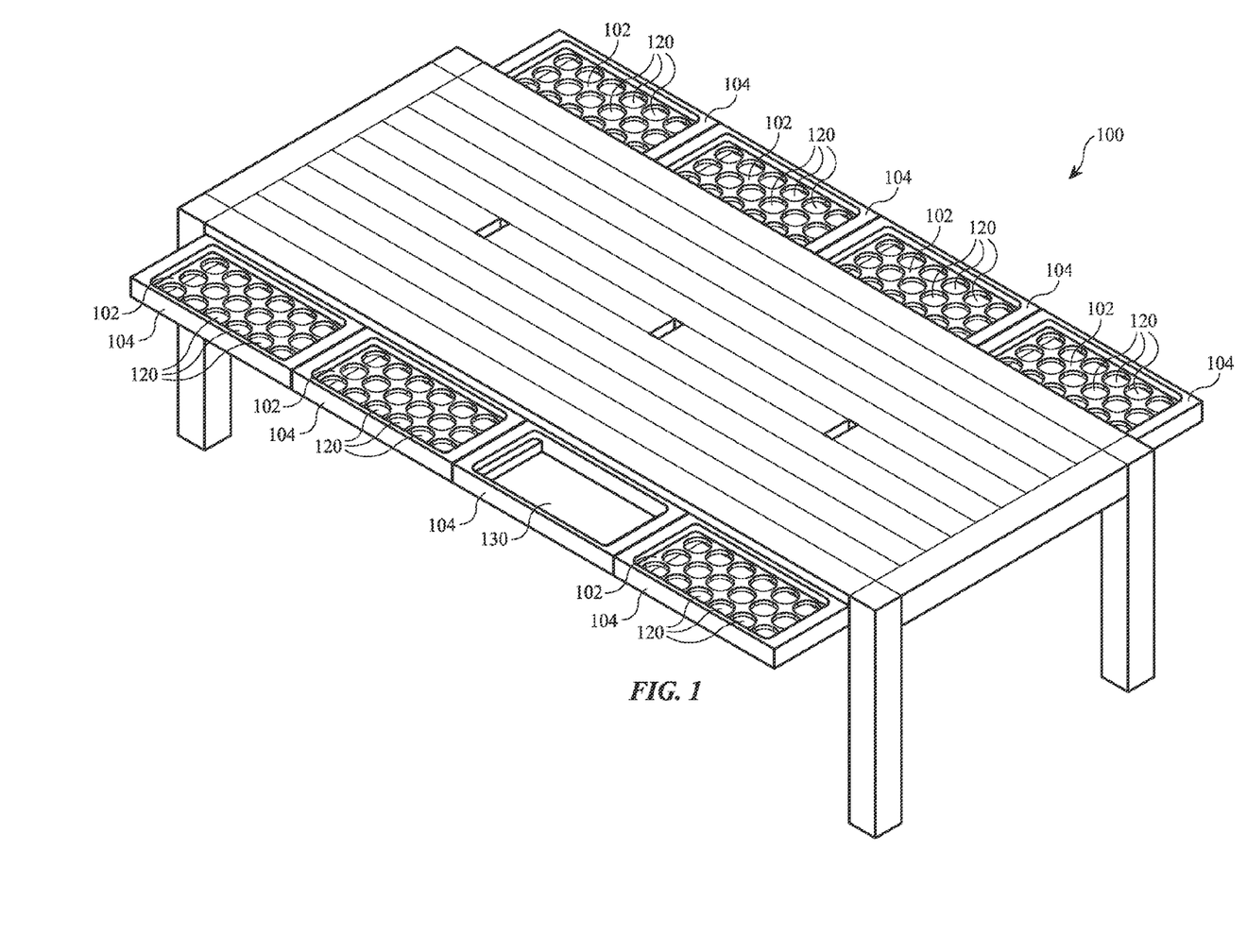
FIG. 1 shows a perspective view of a display system according to some embodiments.
Figure 2:
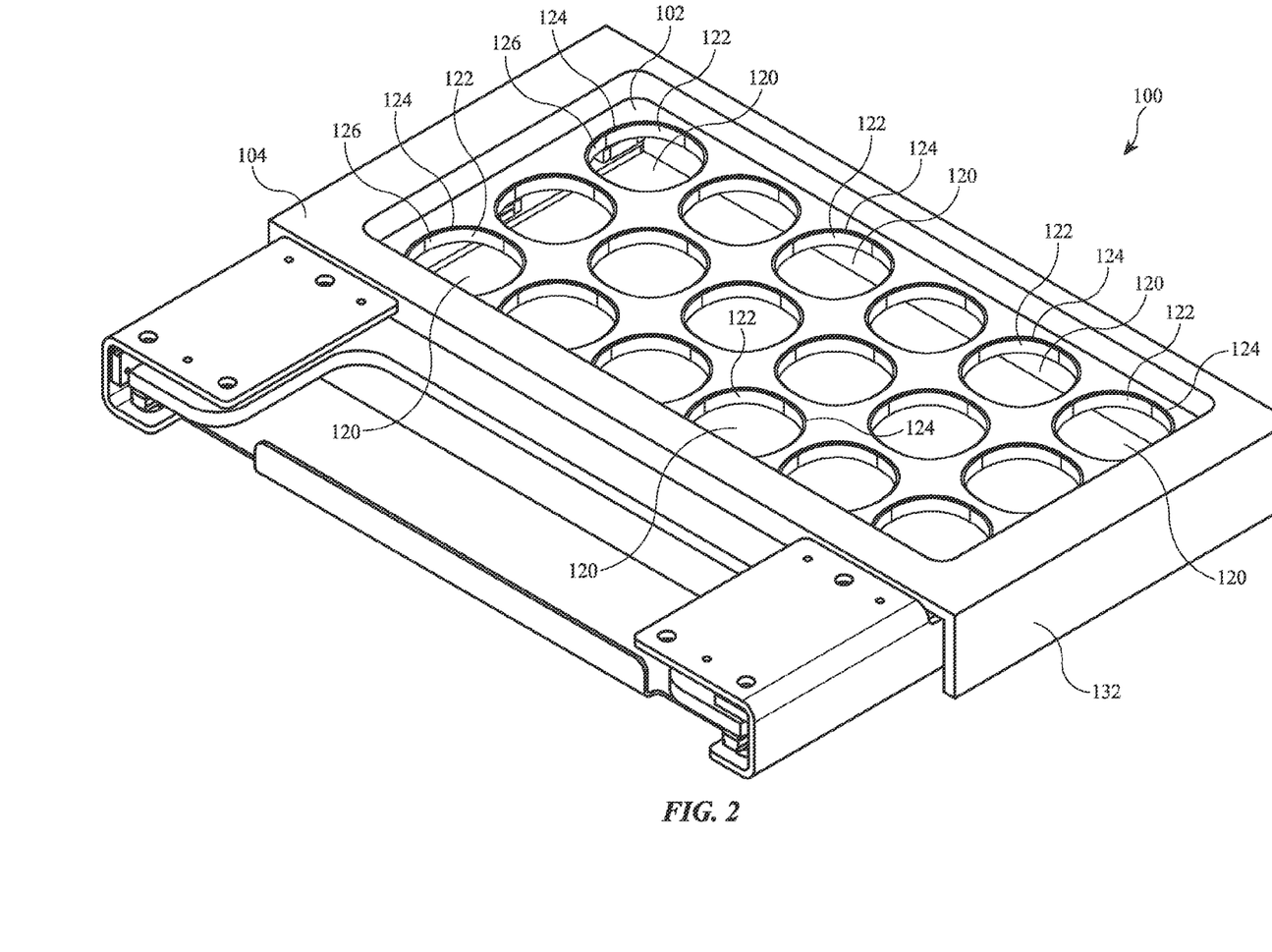
FIG. 2 shows a perspective view of a display system according to some embodiments.
Figure 3:
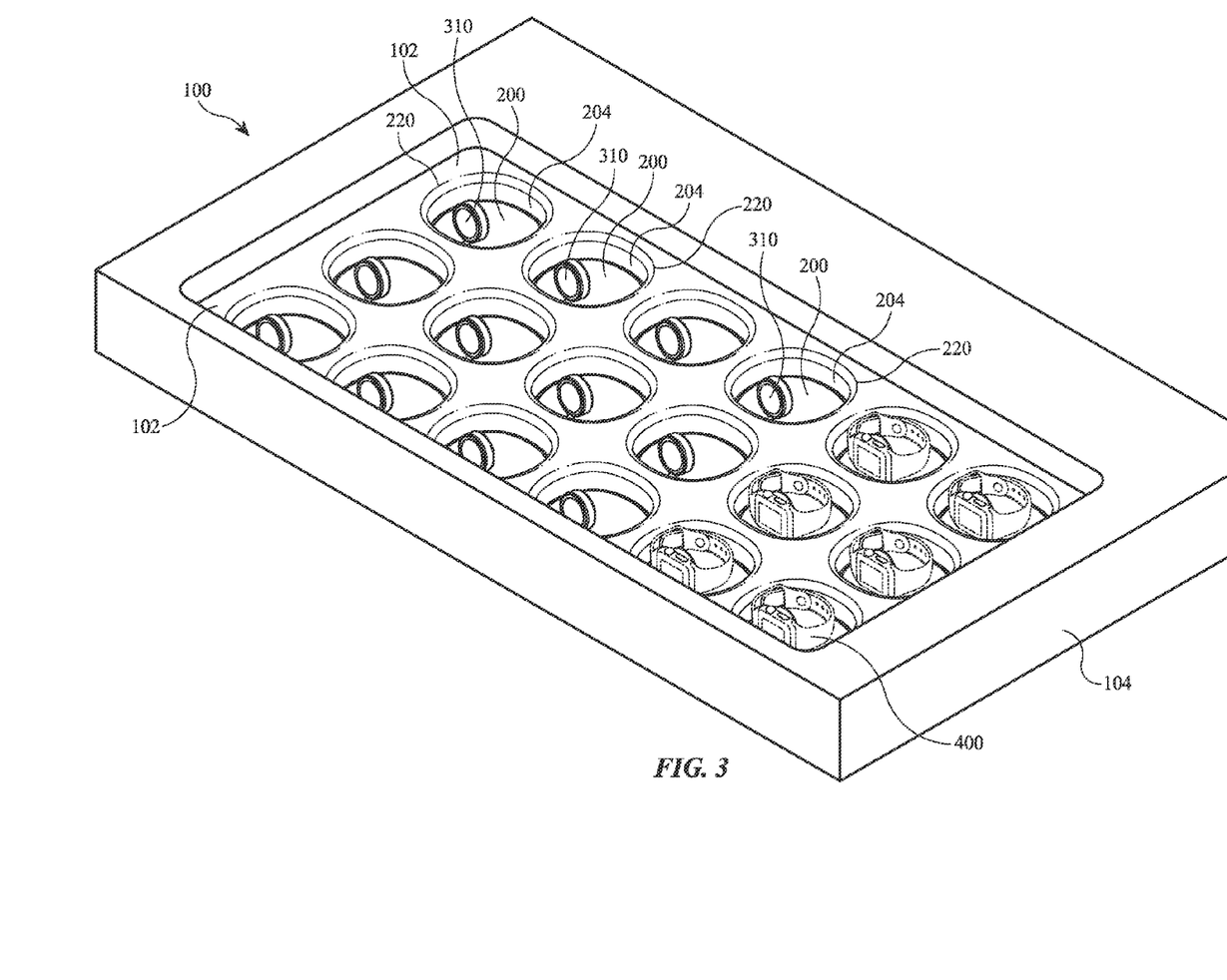
FIG. 3 shows a perspective view of a display system according to some embodiments.
Figure 4:
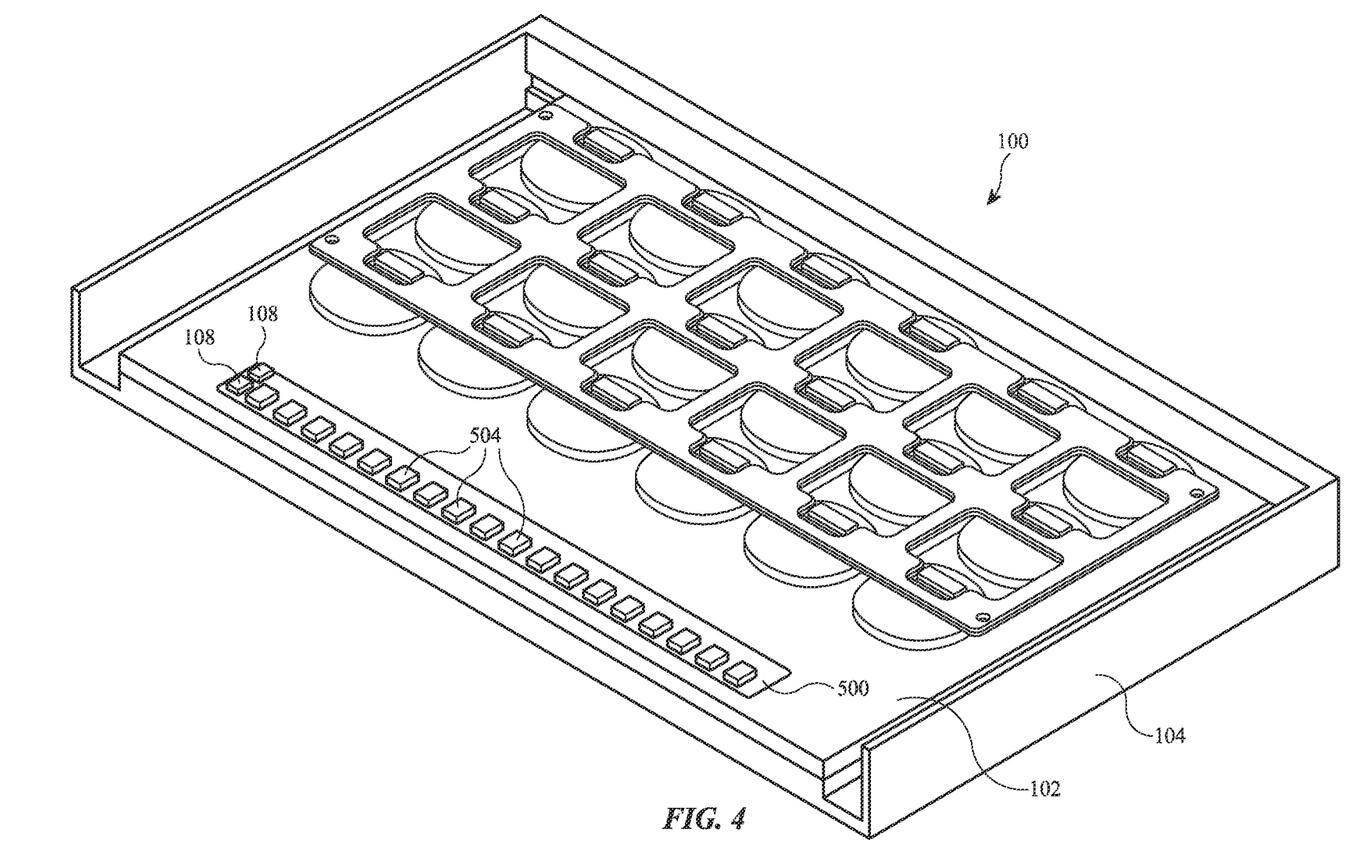
FIG. 4 shows a perspective view of a display system according to some embodiments.

Display system 100 according to some embodiments is shown in FIGS. 1-3. FIGS. 1 and 2 show tray 102 without cups 200 and FIG. 3 shows tray 102 with cups 200 and with charging elements 310.

In some embodiments, as shown, for example, in FIGS. 1 and 2, tray 102 may be disposed within a housing 104. Housing 104 may include a housing cavity 130. A mounting surface 138 may be disposed below display surface 208 of tray 102 and spaced apart therefrom, forming a portion of the bottom of cavity 130 (see, e.g., FIG. 9).

As used herein, "housing" encompasses any receptacle that may hold a tray 102. In some embodiments, housing 104 may be a drawer 132 (see FIG. 2). Drawer 132 may be disposed within a table for conveniently displaying electronic devices 400. In some embodiments, housing 104 may be a portable display case 133, which may include a base 134 and a lid 136, or just a base 134 (see FIG. 9). In some cases, retailers may store electronic devices 400 in a closed portable display case 133 or a closed drawer 132 when electronic devices 400 are not in use (e.g., when a retail location is closed, when extra electronic devices 400 are available, when electronic devices 400 are not being displayed for a customer, etc.), and may display electronic devices 400 in an open display case 133 or an open drawer 132 as desired, (e.g., for a customer to view). In some embodiments, housings according to embodiments of the present invention may be or may be formed as part of a table, such as a drawer or display cavity as described in U.S. Patent Application Nos. 62/045,470, 62/045,455, and/or 62/045,457, all filed on Sep. 3, 2014. Each of these applications is incorporated herein in its entirety by reference thereto.

As used herein, "lid" encompasses any top to a base. For example, lid 136 may be a panel connected to the base, a panel configured to snap onto the base, a panel configured to latch onto the base, or a panel that sits on top of the base. In some embodiments, lid 136 may be removed from the top of base 134 while the housing is being accessed (e.g., by a retailer or customer) for using, displaying, testing, and/or providing technical assistance related to electronic devices 400 therein. In some embodiments, lid 136 may remain on base 134 while displaying electronic devices 400 (e.g., lid 136 may be transparent).

In some embodiments, lid 136 may protect electronic devices 400 within portable display case 133 from outside dust or debris. Lid 136 may conceal the contents stored within portable display case 133 (e.g., lid 136 may be opaque). In some embodiments, lid 136 may be used as a display surface. For example, electronic devices 400 may be removed from housing 104 and displayed on lid 136. In some embodiments, lid 136 may be used as a display surface (e.g., when placed adjacent to base 134 or when on top of base 134 in the closed configuration). Hardware or accessories may be placed onto lid 136 (e.g., for display).

Figure 6:
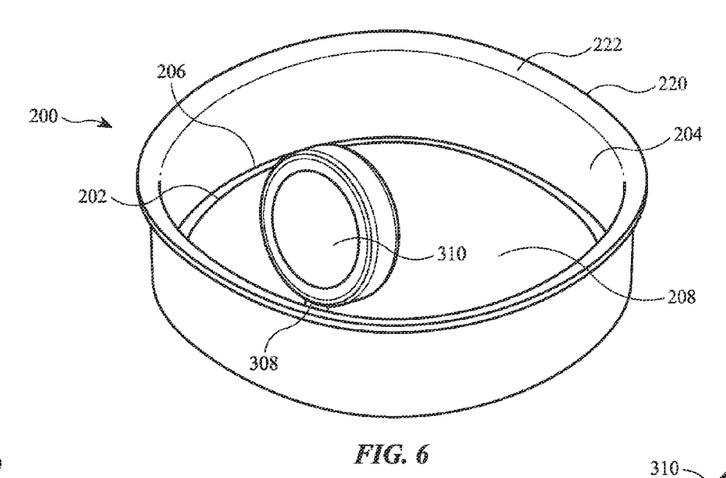
FIG. 6 shows a perspective view of a charging fixture according to some embodiments.
Figure 7:
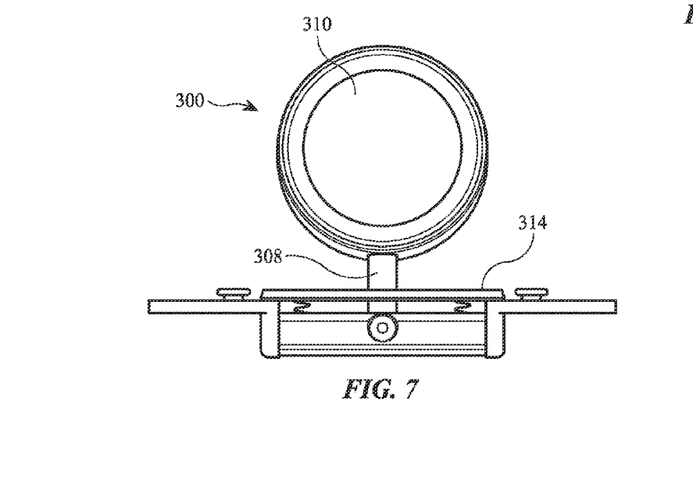
FIG. 7 shows a perspective view of a charging fixture according to some embodiments.
Figure 8:
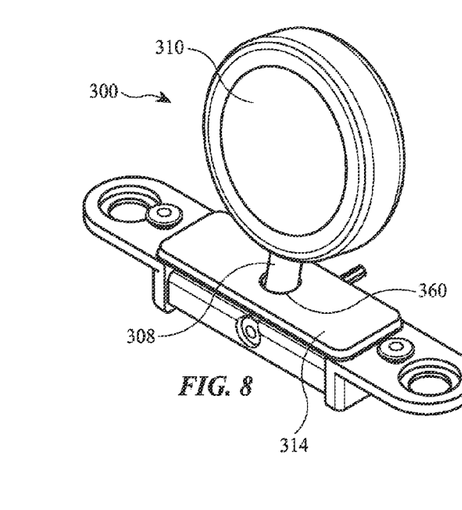
FIG. 8 shows a perspective view of a charging fixture according to some embodiments.

In some embodiments, display system 100 may include a cup 200 with a bottom surface 202 and a perimeter surface 204 extending from bottom surface 202 (see, e.g., FIGS. 3 and 6). Bottom surface 202 and perimeter surface 204 may define an inner cavity 206. In some embodiments, bottom surface 202 may be a completely flat surface. In some embodiments, bottom surface 202 may be a rounded surface (e.g., concave or convex). Cup 200 may include a display surface 208 disposed on bottom surface 202. In some embodiments, bottom surface 202 may include display surface 208 (e.g., display surface 208 may be bottom surface 208 or a portion thereof). In some embodiments, display surface 208 may be a completely flat surface. In some embodiments, display surface 208 may be a rounded surface (e.g., concave or convex).

In some embodiments, display surface 208 may have a display surface aperture 230 extending therethrough (and thus display surface 208 may include an area surrounding display surface aperture 230). In some embodiments, display surface aperture 230 may be located in the middle of bottom surface 202 of cup 200. In some embodiments display surface aperture 230 may be located offset from the middle of bottom surface 202 of cup 200. In some embodiments, display surface aperture 230 may be within housing cavity 130 (e.g., along with cup 200).

As shown in FIG. 2, tray 102 may include a sidewall 122 extending from an upper surface 126 of tray 102 to define aperture 120. Tray 102 may include a plurality of apertures 120. As shown in FIG. 3, cup 200 may be disposed within aperture 120 of tray 102. In some embodiments, perimeter surface 204 is an interior surface of a sidewall 210 of cup 200, and an exterior surface of sidewall 210 may be disposed on a shelf 124 of sidewall 122 of tray 102, to support cup 200 in aperture 120.

Figure 9:
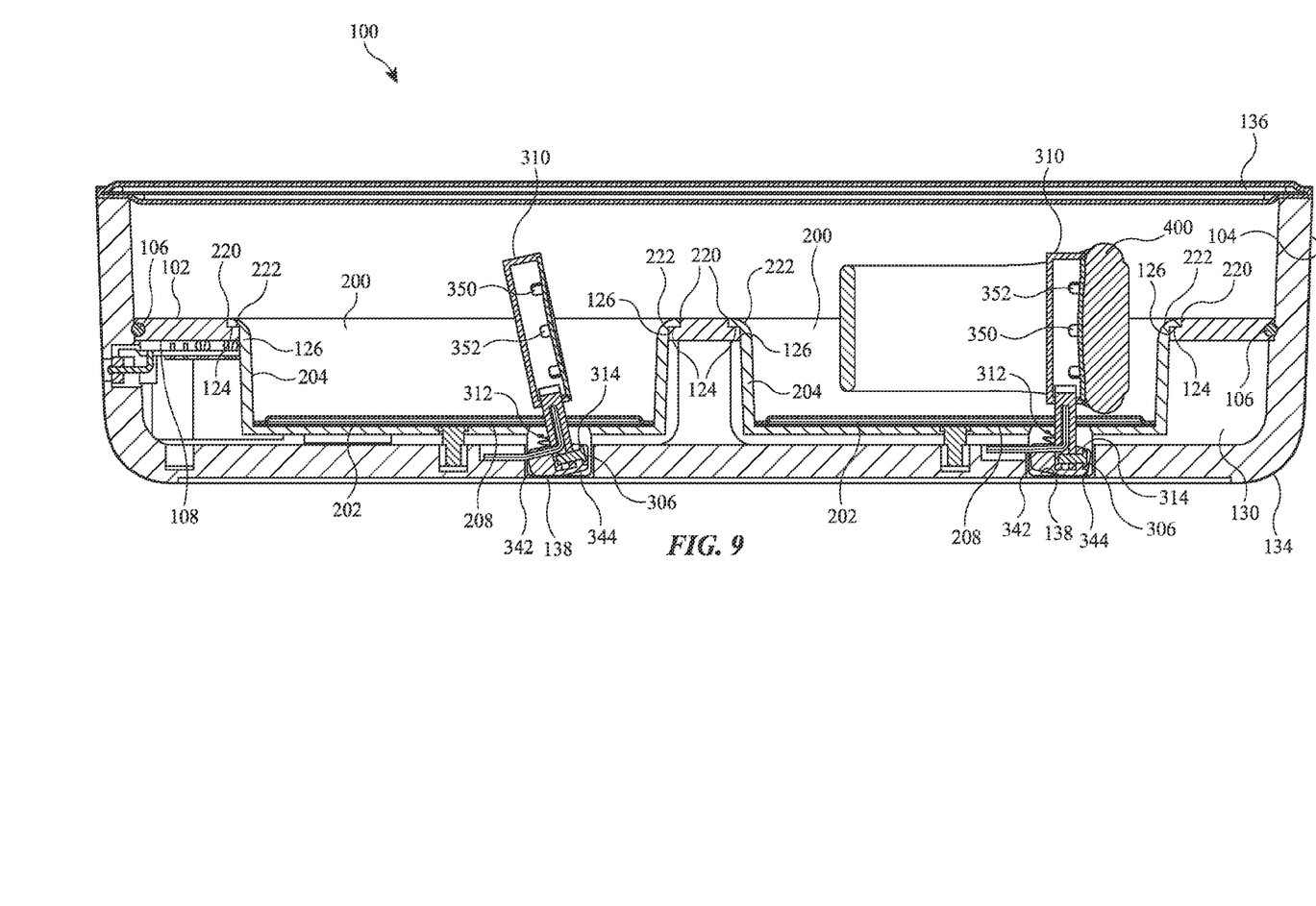
FIG. 9 shows a cross-sectional view of a display system according to some embodiments.

In some embodiments, aperture 120 may have a shape corresponding to an exterior shape of cup 200 (e.g., circular) to accommodate cup 200. Upper portion 222 of perimeter surface 204 of cup 200 may be curved to an edge of upper surface 126 of tray 102. The tangent to curved upper portion 222 of perimeter surface 204 may align with flat upper surface 126 of tray 102 at the edge of upper portion 222 of perimeter surface 204 of cup 200. In some embodiments, an upper edge of upper portion 222 of perimeter surface 204 may be flush with upper surface 126 of tray 102 (i.e., the upper edge of upper portion 222 may be aligned with upper surface 126 such it is not positioned above or below upper surface 126 by more than ⅛ of an inch. As seen in FIGS. 3 and 9, tray 102 may have a completely flat profile along its upper surface 126 when perimeter surface 204 of cup 200 is flush with upper surface 126 of tray 102. In some embodiments, the elements and systems described herein (e.g., charging fixture 300 and charging element 310) may be used in conjunction with one or more of the elements and systems described in U.S. Patent Application Nos. 62/045,476, filed on Sep. 3, 2014; 62/129,608, filed on Mar. 6, 2015; and Ser. No. 14/835,396, filed on Aug. 25, 2015 (e.g., the mounting arrangement of the charging fixture or the charging element thereof disclosed in these applications). These applications are incorporated herein in their entirety by reference thereto.

In some embodiments display system 100 may include a charging fixture 300 that may provide power to at least one electronic device 400. In some embodiments, charging fixture 300 may provide power to a plurality of electronic devices 400. Charging fixture 300 may include a charging element 310, where charging element 310 provides power to at least one electronic device 400 when charging element 310 is in within a charging range of electronic device 400 (e.g., in contact with or in proximity to electronic device 400). Charging element 310 may include a magnet 350 disposed within charging element 310, where magnet 350 attracts electronic device 400 and charging element 310 toward each other. In some embodiments, charging element 310 may include an induction coil 352, where induction coil 352 inductively charges electronic device 400 when charging element 310 is within the charging range of an electronic device 400.

In some embodiments, display system 100 may include a plurality of cups 200 and a plurality of charging fixtures 300. Each charging fixture 300 may be disposed in one of the plurality of cups 200. Each charging fixture 300 may provide power to an electronic device 400. In some embodiments, each charging fixture 300 may provide power to a plurality of electronic devices 400.

Figure 5:
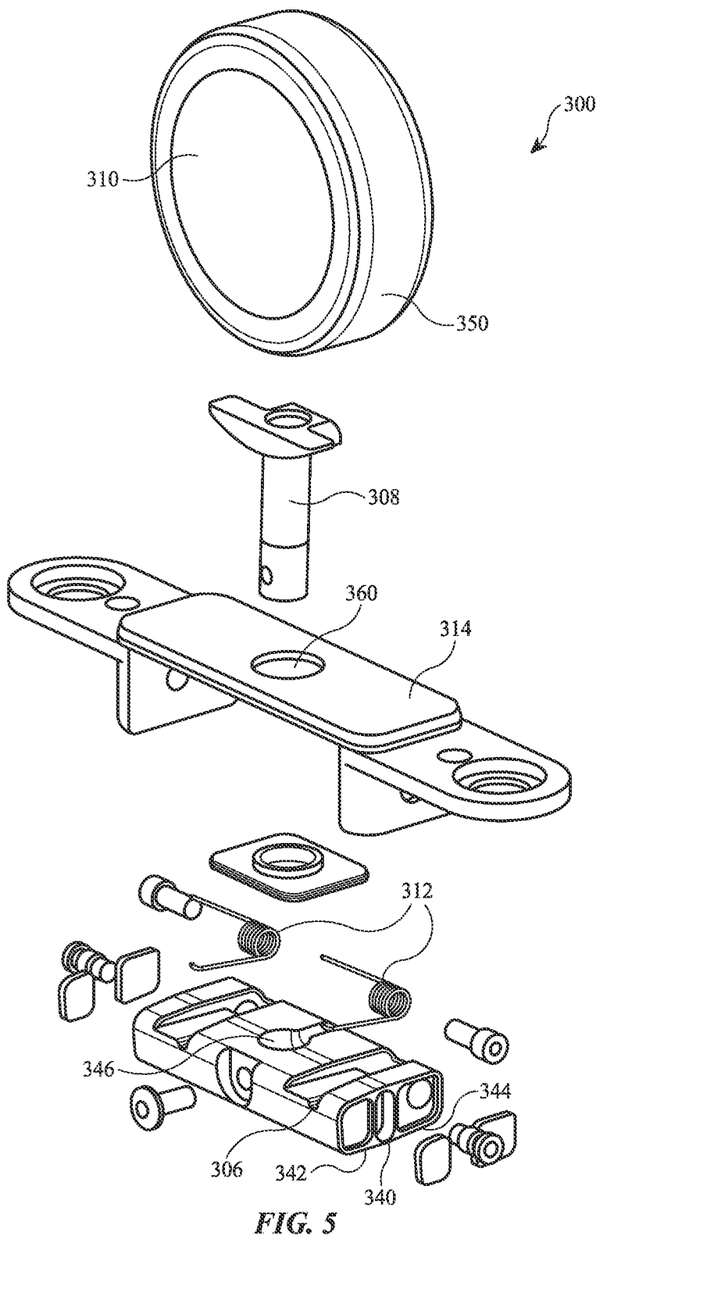
FIG. 5 shows an exploded view of a charging fixture according to some embodiments.

FIG. 5 shows an exploded view of charging fixture 300 according to some embodiments. Charging fixture 300 may include charging element 310, a post 308, a support bracket 314, and a bearing 306. Bearing 306 may include an aperture 346 (which may be a recess or a through-hole) and support bracket 314 may include an aperture 360 (which may be a through-hole). Post 308 may extend from bearing aperture 246, through support bracket aperture 360, and be fixed to charging element 310. Post 308 may be rigid and hold charging element 310 in an upright position relative to display surface 208 (see FIGS. 7 and 8). In some embodiments, post 308 may be flexible, allowing post 308 and charging element 310 to tilt, bend, or stretch, for example.

In some embodiments, support bracket 314 may be fixed to mounting surface 138. In some embodiments, support bracket 314 may be fixed to one or both of mounting surface 138 and cup 200. Each of these applications is incorporated herein in its entirety by reference thereto. Support bracket 314 and post 308 may include any type of fastening mechanism to effect this attachment, including, for example, clamps, screws, adhesive, and welding. In some embodiments, as shown, for example, in FIGS. 5 and 7-9, support bracket 314 may be disposed below display surface 208 and over bearing 306.

In some embodiments, portions of charging fixture 300 may be visible and accessible within display system 100. For example, charging fixture 300 may be at least partially disposed within cup cavity 206 (e.g., FIG. 6 shows charging element 310 of charging fixture 300 disposed within cup 200) and thereby visible and accessible when cup 200 is visible and accessible (e.g., when drawer 132 or portable display case 133 are open). In some embodiments, as shown, charging element 310 may be disposed above display surface 208. In some embodiments, post 308 may be at least partially disposed within cavity 206 of cup 200 and above display surface 208 (see FIG. 9). In some embodiments, charging element 310 and post 308 and at least a portion of support bracket 314 may extend through aperture 230 of cup 200 and be at least partially disposed within cavity 206 of cup 200 and above display surface 208.

Charging element 310 may be movable between a neutral position and a charging position. To accomplish this, a magnet 350 may be disposed within charging element 310. Charging element 310 may be configured to overcome a spring force from, for example, spring 312 connected to bearing 306, by magnetic attraction to electronic device 400 when electronic device 400 is within range of magnet 350, to thereby move between from the neutral position to the charging position. For example, in FIG. 9, the left display surface 208 has no electronic device 400, so its charging element 310 is in the neutral position, while the right display surface 208 has an electronic device 400 thereon, so its charging element has tilted and is in the charging position.

When electronic device 400 is positioned within magnetic range of charging element 310, charging element 310 may tilt toward electronic device 400 and may magnetically couple with electronic device 400. As used herein, "magnetic range" refers to the distance between electronic device 400 and charging element 310 within which electronic device 400 and charging element 310 may couple under power of magnetic attraction. In some embodiments, electronic device 400 may be within magnetic range of charging element 310 if electronic device 400 is close enough to charging element 310 to cause charging element to tilt toward electronic device 400. For example, electronic device 400 may be within magnetic range if it is within 5 millimeters of charging element 310 (e.g., within 3 millimeters of charging element 310). In some embodiments, the magnetic range may depend on the size of magnet 350 or a magnet of electronic device 400. For example, an increase in either magnet size may increase the magnetic range. In some embodiments, electronic device 400 may effect a magnetic attraction with charging element 310 when electronic device 400 is placed on display surface 208.

In some embodiments, the neutral, or default, position of charging element 310 is tilted toward a center of display surface 208, away from an intended location of electronic device 400 (or at least of the portion of electronic device 400 configured to receive power inductively from charging element 310). When a user places electronic device 400 in proximity to charging element 310, charging element 310 tilts toward electronic device 400 to position itself in an optimum (or at least better) position to transfer power to electronic device 400 inductively. For example, charging element 310 may tilt about an axis of bearing 306, to which charging element 310 may be coupled via post 308.

The neutral position of charging element 310 may be maintained in the absence of electronic device 400 (or any other item that may apply an outside force on charging element 310) through its support structure, which includes post mount bearing 306. Bearing 306 may receive post 308 in aperture 346 of bearing 306. Bearing 306 may be disposed on a mounting surface 138 of display system housing 104, and may be disposed below support bracket 314. Support bracket 314 may be fixedly coupled to mounting surface 138. Bearing 306's position on mounting surface 138 may be constrained by support bracket 314 (e.g., via post 308's extension through aperture 360 of support bracket), though in some embodiments bearing is not directly fastened to mounting surface 138.

Since in some embodiments bearing 306 is not directly fastened to mounting surface 138, bearing 306 may be free to pivot relative to mounting surface 138. As noted above, aperture 360 of support bracket 314 may help constrain motion of bearing 306, but aperture 360 may be larger than an outer diameter of post 308 extending therethrough (see, e.g., FIG. 8). Thus, bearing 306 may be free to pivot to the extent permitted by motion of post 308 within aperture 360.

Bearing 306 may be a rocker bearing having a bottom surface 340. Bearing 306 may have a first flat surface 342 on bottom surface 340 and a second flat surface 344 on bottom surface 340. First flat surface 342 and second flat surface 344 may form an obtuse angle. First flat surface 342 may be in contact with mounting surface 138 in the neutral position and second flat surface 344 may be in contact with mounting surface 138 in the charging position. Rocker bearing may pivot between first and second flat surfaces 342 and 344 depending on whether charging element 310 is magnetically attracted into the charging position or not.

In some embodiments, bearing 306 may move vertically relative to mounting surface 138, towards display surface 208. Bottom surface 340 may be in contact with mounting surface 138 in the neutral position and first flat surface 342 or second flat surface 344 may be at least partially in contact with mounting surface 138 in the charging position. In some embodiments, bottom surface 340 may be in contact with mounting surface 138 in the neutral position and bearing 306 may not be in contact with mounting surface 138 in the charging position. For example, bearing 306 may be raised off of mounting surface 138 by magnetic force between magnet 350 of charging element 310 and a magnet (or magnetic material) of a device 400 on display surface 208, where the magnet of device 400 is disposed a greater distance from display surface 208 than is magnet 350 when charging element 310 is in the neutral position. A benefit of vertical movement of bearing 306 is that it allows charging fixture 300 to accommodate various sizes of electronic devices 400. Charging fixture 300 may secure alignment with electronic device 400 upon magnetic attraction in the charging position, thereby positioning charging element 310 in an optimal position to inductively provide power to electronic device 400. Optimal positioning can help increase charging efficiency, which increases as charging element 310 and a receiver coil of an electronic device become better aligned.

Spring 312 may bias rocker bearing in the neutral position, and so magnetic attraction between charging element 310 and electronic device 400 may drive movement of rocker bearing 306 (and thus charging element 310) into the charging position if the magnetic force is sufficient to overcome the spring force applied by spring 312. This may occur, for example, when charging element 310 is in proximity to electronic device 400 (e.g., within magnetic range thereof), thereby causing charging element 310 to rotate (about an axis of rocker bearing 306) and tilt toward electronic device 400 into an optimal position to inductively provide power to electronic device 400 (while causing attendant rotation of rocker bearing 306 and post 308).

For example, in some embodiments, spring 312 may be disposed between rocker bearing 306 and support bracket 314 as shown in FIG. 9, above first flat surface 342 of rocker bearing 306. The force applied to rocker bearing 306 by spring 312 will thus push first flat surface 342 toward mounting surface 138, corresponding to the neutral position. Spring 312 may be positioned between rocker bearing 306 and any element of display system 100 that rocker bearing 306 pivots relative to. For example, it may be positioned between rocker bearing 306 and mounting surface 138.

The magnetic force of magnet 350 overcomes the biasing force of spring 312 when charging element 410 is in proximity to electronic device 400, thereby causing charging element 410 to rotate (about an axis of rocker bearing 306) and tilt toward electronic device 400 into an optimal position to inductively provide power to electronic device 400 (while causing attendant rotation of rocker bearing 306 and post 308).

In some embodiments, charging element 310 may include an induction coil 352. When charging element 310 is magnetically coupled to electronic device 400 or otherwise within an inductive charging range of electronic device 400, electronic device 400 may be inductively charged through induction coil 352. In some embodiments, the magnetic attraction between electronic device 400 and charging element 310 may be relatively higher where the level of inductive charge received by electronic device 400 from induction coil 352 is relatively higher, and the magnetic attraction between electronic device 400 and charging element 310 may be relatively lower where the level of inductive charge received by electronic device 400 from induction coil 352 is relatively lower. Tray 102, cup 200, and charging element 310 may be disposed within cavity 130 of housing 104, and a power input port 108 may be disposed in housing 104 and may be configured to receive power from an outside power source and to supply power to charging element 310. In some embodiments, power input port 108 may be disposed beneath tray 102.

Figure 10:
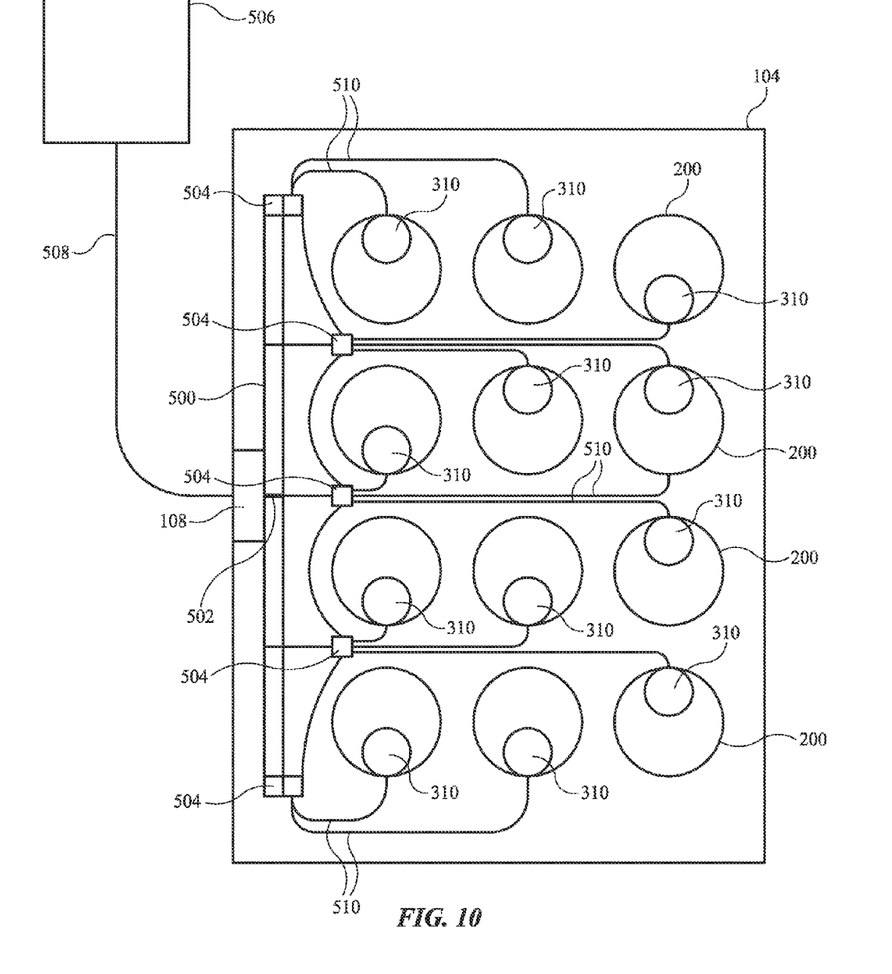
FIG. 10 shows a top schematic view of a display system according to some embodiments.

In some embodiments, as shown in, for example, FIG. 10, a printed circuit board (PCB) 500 may be disposed in housing 104 and may comprise a single power input 502 corresponding to power input port 108. In some embodiments, for example, power input 502 may receive power from a power distributor 506, which may be or have the characteristics of power distributors such as the power converters (including DC-to-DC power converters 1200 and 1300) disclosed in U.S. Patent Application Nos. 62/045,455 and 62/045,457, filed on Sep. 3, 2014. Each of these applications is incorporated herein in its entirety by reference thereto.

In some embodiments, PCB 500 may regulate voltage received by power distributor 506. In some embodiments, PCB 500 may increase the voltage received by power distributor 506 to accommodate or otherwise account for voltage lost when power distributor 506 provides power through power cords 508 that connect to power outputs 504. In some embodiments, PCB 500 may decrease the voltage received by power distributor 506 if more power is provided by the power distributor than is needed by power outputs 504 to supply to charging fixtures 300.

PCB 500 may include a plurality of power outputs 504, where each of the charging fixtures 300 is connected to one of the plurality of power outputs 504 (e.g., via wires 510). As shown, for example, in FIG. 4's bottom perspective view of a drawer 132 of display system 100, in some embodiments, power input port 108 may be connected to a plurality of power outputs 504 on PCB 500 and may be disposed below tray 102. Power outputs 504 may include any suitable power or data outlet such as, for example, A/C or D/C power, Universal Serial Bus (USB), micro-USB, mini-USB, Advanced Technology Attachment (ATA) (e.g. Parallel ATA, Serial ATA), Ethernet (e.g., Cat 5), or any other standard or proprietary connection format.

In some embodiments, PCB 500 may terminate positive and negative data signals (e.g., USB D+ and D−) from charging elements 310 so as to control the maximum amount of current a charging element 310 can draw. In other words, charging fixture 300 may use a data connection between charging element 310 and PCB 500 to determine an optimum amount of current for charging element 310 to draw (e.g., a maximum amount, a most efficient amount), thereby controlling the amount of current a charging element 310 draws from PCB 500.

In some embodiments, power outputs 504 may be single stacked. In some embodiments, power outputs 504 may be double stacked. Power outputs 504 that are double stacked may efficiently store power outputs 504 vertically and may allow a compact storage of power outputs 504 and accessories relating to providing power. Power outputs 504 may be connected to and provide power to charging fixtures 300. Charging fixtures 300 may be connected to power outputs 504 by wires.

As shown in FIG. 9, in some embodiments display system 100 may include a gasket 106 that is disposed between housing 104 and tray 102. Gasket 106 may be immediately adjacent to tray 102 and housing 104 and form a seal between housing 104 and tray 102. In some embodiments, gasket 106 may help prevent tray 102 from sliding within housing 104 and may maintain tray 102 in a neutral position. Gasket 106 may help prevent noise between tray 102 and housing 104 when housing 104 is moved (e.g., by preventing tray 102 from rattling within housing 104).

The foregoing description, for purposes of explanation, used specific nomenclature to provide a thorough understanding of the described embodiments. However, it will be apparent to one skilled in the art that many of the specific details are not required in order to practice the described embodiments. Thus, the foregoing descriptions of the specific embodiments described herein are presented for the purposes of illustration and description. They are not target to be exhaustive or to limit the embodiments to the precise forms disclosed. It will be apparent to one of ordinary skill in the art that many modifications and variations are possible in view of the above teachings.

The Detailed Description section is intended to be used to interpret the claims. The Summary and Abstract sections may set forth one or more but not all exemplary embodiments of the present invention as contemplated by the inventors, and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A display system for displaying an electronic device, the display system comprising:
 a cup comprising a bottom surface and a perimeter surface extending from the bottom surface, wherein the bottom surface and the perimeter surface define an inner cavity; and
 a charging fixture at least partially disposed within the inner cavity of the cup and configured to provide power to an electronic device.

2. The display system of claim 1, wherein the charging fixture comprises a magnet for coupling the charging fixture to an electronic device by magnetic force.

3. The display system of claim 1, further comprising:
 a plurality of the cups; and
 a plurality of the charging fixtures,
 wherein each cup of the plurality of cups contains one charging fixture of the plurality of charging fixtures.

4. The display system of claim 1, further comprising a tray defining an aperture therethrough,
 wherein the cup is disposed in the aperture, and
 wherein an upper edge of the perimeter surface of the cup is flush with an upper surface of the tray.

5. The display system of claim 1, further comprising a tray having a flat upper surface defining an aperture therethrough,
 wherein the cup is disposed in the aperture,
 wherein an upper portion of the perimeter surface of the cup is curved to an upper edge thereof, and
 wherein a tangent to a curve of the upper portion of the perimeter surface aligns with the flat upper surface of the tray at the upper edge of the upper portion of the perimeter surface of the cup.

6. The display system of claim 1, further comprising a tray defining an aperture therethrough,
 wherein the cup is disposed in the aperture, and
 wherein the tray, the cup, and a charging element of the charging fixture are disposed within a housing.

7. The display system of claim 6, wherein the housing is a drawer.

8. The display system of claim 6, wherein the housing is a portable display case comprising a base and a lid.

9. The display system of claim 6, further comprising a gasket disposed between the housing and a sidewall of the tray, thereby forming a seal between the tray and the housing.

10. The display system of claim 6, further comprising a power supply disposed in the housing configured to supply power to the charging element.

11. The display system of claim 1, wherein the bottom surface defines an aperture therethrough, and
 wherein the charging fixture extends through the aperture.

12. The display system of claim 1, wherein the charging fixture comprises an induction coil for inductively charging an electronic device.

13. A charging system for providing power to an electronic device, the charging system comprising:
 a display surface defining an aperture therethrough;
 a mounting surface disposed below the display surface and spaced apart therefrom;
 a bearing disposed on the mounting surface;
 a post extending from the bearing through the aperture of the display surface; and
 a charging element coupled to the post and disposed above the display surface, the charging element configured to provide power to an electronic device.

14. The charging system of claim 13, wherein the charging element is movable between a neutral position and a charging position by pivoting of the bearing with respect to the mounting surface such that the charging element tilts toward or away from a center of the display surface.

15. The charging system of claim 14, wherein the bearing is biased in the neutral position by a spring force.

16. The charging system of claim 14, wherein the bearing is biased in the neutral position by a spring force, and
 wherein the charging element comprises a magnet configured to overcome the spring force by magnetic attraction to an electronic device when the electronic device is placed on the display surface.

17. The charging system of claim 13, further comprising a support bracket disposed below the display surface and fixed to the mounting surface,
 wherein the support bracket is disposed over the bearing, and
 wherein the post extends through an aperture of the support bracket.

18. The charging system of claim 14, wherein the bearing is a rocker bearing having a first flat surface on a bottom thereof, and a second flat surface on the bottom thereof,
 wherein the first flat surface and the second flat surface form an obtuse angle,
 wherein the first flat surface is in contact with the mounting surface in the neutral position, and
 wherein the second flat surface is in contact with the mounting surface in the charging position.

19. A display system for displaying electronic devices, the display system comprising:
 a cup defining a cavity and an outer surface;
 a tray defining at least one aperture, wherein the cup is disposed within the at least one aperture;
 a housing defining a cavity, wherein the tray and the cup are disposed within the cavity of the housing; and
 a charging fixture mounted to the housing and at least partially disposed within the cup, the charging fixture configured to provide power to an electronic device.

20. The display system of claim 19, wherein the cup further defines at least one aperture therethrough, and wherein at least a portion of the charging fixture extends through the at least one aperture.

21. The display system of claim 19, wherein the cup further defines at least one aperture therethrough, and wherein a charging element of the charging fixture is disposed within the cavity of the cup above the at least one aperture.

22. The display system of claim 21, further comprising a post, wherein the post extends from a bearing and is coupled to the charging element, and wherein at least a portion of the post traverses through the at least one aperture of the cup.

23. A display system for displaying an electronic device; the display system comprising:
 cups, wherein each of the cups defines an inner cavity;
 charging fixtures, wherein each of the inner cavities contains one of the charging fixtures; and
 a printed circuit board (PCB) disposed in a housing wherein the PCB comprises a power outputs, and wherein each of the charging fixtures is connected to one of the power outputs, each charging fixture configured to provide power to an electronic device.

24. The display system of claim 23, wherein the PCB comprises a single power input.

25. The display system of claim 23, wherein the power outputs are Universal Serial Bus ports.

26. The display system of claim 23, further comprising a tray spaced above at least a portion of the housing,
wherein the charging fixtures are connected to the power outputs by wires disposed between the tray and the housing.

* * * * *

UNITED STATES PATENT AND TRADEMARK OFFICE
CERTIFICATE OF CORRECTION

PATENT NO. : 9,787,129 B2
APPLICATION NO. : 14/837603
DATED : October 10, 2017
INVENTOR(S) : Green et al.

It is certified that error appears in the above-identified patent and that said Letters Patent is hereby corrected as shown below:

In the Claims

In Column 12, Line 56, Claim 23, replace "electronic device;" with --electronic device,--.

In Column 12, Line 62, Claim 23, replace "comprises a power" with --comprises power--.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*